United States Patent [19]

Tanaka

[11] Patent Number: 5,475,457
[45] Date of Patent: Dec. 12, 1995

[54] FOCAL POINT ADJUSTING DEVICE FOR ZOOM LENS

[75] Inventor: Hitoshi Tanaka, Tokyo, Japan

[73] Assignee: Asahi Kogaku Kogyo Kabushiki Kaisha, Tokyo, Japan

[21] Appl. No.: 265,637

[22] Filed: Jun. 24, 1994

Related U.S. Application Data

[63] Continuation of Ser. No. 966,826, Oct. 27, 1992, abandoned.

[30] Foreign Application Priority Data

Oct. 30, 1991 [JP] Japan ................................ 3-310192

[51] Int. Cl.$^6$ ................................................ G03B 1/18
[52] U.S. Cl. ...................... 354/195.12; 354/286; 359/695
[58] Field of Search ................................. 354/288, 286, 354/195.12; 359/695, 702

[56] References Cited

U.S. PATENT DOCUMENTS

| | | |
|---|---|---|
| 3,876,290 | 5/1975 | Back . |
| 3,897,998 | 8/1975 | Someya et al. . |
| 4,281,907 | 8/1981 | Kamata . |
| 4,387,968 | 6/1983 | Sekiguchi . |
| 4,458,990 | 7/1984 | Kawai . |
| 4,771,303 | 9/1988 | Matsumoto et al. ................. 354/288 |
| 4,873,542 | 10/1989 | Nakayama ..................... 354/195.1 |
| 4,910,544 | 3/1990 | Nomura . |
| 5,035,493 | 7/1991 | Tanaka ........................ 354/195.12 |
| 5,086,312 | 2/1992 | Tanaka et al. ................. 354/195.12 |
| 5,181,144 | 1/1993 | Shirie et al. .................. 354/195.12 |

FOREIGN PATENT DOCUMENTS

| | | |
|---|---|---|
| 2128111 | 10/1990 | Japan . |
| 1432961 | 5/1976 | United Kingdom . |
| 2102143 | 1/1983 | United Kingdom . |
| 2230354 | 10/1990 | United Kingdom . |
| 2241084 | 8/1991 | United Kingdom . |

*Primary Examiner*—Monroe H. Hayes
*Attorney, Agent, or Firm*—Sandler, Greenblum & Bernstein

[57] ABSTRACT

A zoom lens having a plurality of movable lens groups, and an apparatus which is used to adjust the position of the rearmost lens group of the plurality of movable lens groups in the optical axis direction upon assembly of the zoom lens, so that a focal point of the zoom lens does not deviate upon zooming.

8 Claims, 5 Drawing Sheets

FOCAL POINT ADJUSTING DEVICE FOR ZOOM LENS

This application is a continuation of application Ser. No. 07/966,826, filed Oct. 27, 1992, now abandoned.

BACKGROUND OF THE INVENTION

1. Field of the Invention

The present invention relates to a zoom lens focal point adjusting device of a camera which adjusts the position of the lenses in the optical axis direction.

2. Description of Related Art

In recent years, zoom lenses, including vari-focal photographing lenses, have included three or more lens groups, rather than two lens groups which have previously been used. The number of lens groups has been increased to meet the demand of photographers who desire a zoom camera having a high-magnification (high-zoom ratio) lens and also high performance.

Before a zoom lens type camera is completely assembled, or at least before it is put on the market, a focal point adjusting operation is often carried out, especially if the zoom camera has a high-zoom ratio. The focal point adjusting operation is effected to adjust the position of one or more of the lenses constituting the zoom lens of a zoom camera in the optical axis direction, after an in-focus state has been obtained, with respect to an object to be photographed. This operation is effected so that the in-focus state will not vary even if zooming or variation of the focal point (zooming or variation of the focal point will hereinafter be collectively referred to as zooming) is effected. This kind of focal point adjusting operation typically uses a lens supporting frame, which holds the lens of a zoom lens, and a lens frame supporting member, which is made separately from the lens supporting frame and which holds the same. The lens supporting frame and the lens frame supporting member are connected by threading. The threading permits adjustment of the relative position of the lens supporting frame and the lens frame supporting member in the optical axis direction. With this arrangement, in accordance with the threading mechanism, the lens, which is to be moved in the optical axis direction to accomplish focal point adjustment, can be continuously moved in the optical axis direction.

In a known zoom camera, having a conventional zoom lens composed of two lens groups, it is often the case that the first lens group, closest to the object side, is moved in the optical axis direction to effect a focal point adjusting operation. The first lens group is the lens group to be adjusted, since this lens group is most easily accessed. However, as for a zoom camera having a zoom lens consisting of three or more lens groups, the amount of deviation of the focal point, with respect to a unit of deviation of the first lens group in the optical axis direction, is relatively small as compared with those of the other lens groups. Therefore, when a focal point adjustment is to be executed with the focal point adjusting mechanism, by moving the first lens group in the optical axis direction, a large space must be reserved in which adjustment can be effected. In other words, the space allotment must be sufficient for the necessary adjustment, resulting in an undesirably large camera.

SUMMARY OF THE INVENTION

The primary object of the present invention is to provide a camera having a focal point adjusting device in which a proper focal point adjustment can be made with a minimum amount of deviation of the lens to be adjusted, so that camera size may be minimized.

To achieve the object mentioned above, according to the present invention, there is provided a camera having a plurality of movable lens groups which constitute a zoom lens. An apparatus is provided which is used to adjust the position of the rearmost lens group of the plurality of movable lens groups in the optical axis direction, upon assembly of the zoom lens, so that a focal point of the zoom lens does not deviate upon zooming.

With this arrangement, since a lens group which deviates the focal point by a relatively large amount per unit deviation, for example, the third lens group, in case the zoom lens comprises three lens groups, can be moved instead of moving the frontmost lens group closest to the object side of the camera. This makes it possible to minimize the amount of deviation of the lens to be adjusted upon assembly, resulting in making a compact camera smaller.

According to another aspect of the present invention, there is provided a camera having a first gear formed to a lens supporting frame and a second gear engaged with the first gear, wherein the second gear is connected to a shaft which can be inserted through a hole in the back of the camera to effect an adjustment of the rearmost lens group.

With this arrangement, the shaft can be rotated from the film side of the camera to accomplish a focal point adjusting operation. A shaft driving mechanism can be provided together with a focal point position detecting mechanism on the same side (i.e., the film side), in the case that the adjusting device is automatic.

According to yet another aspect of the present invention, there is provided a camera having a biasing mechanism which is provided between the lens supporting frame and a lens frame supporting member so that the lens supporting frame and the lens frame supporting member are continuously biased away from each other in the optical axis direction, wherein the biasing mechanism is in the shape of a ring having a projecting portion and wherein the projecting portion is engaged with a groove provided in the lens frame supporting member so that it will not rotate with respect to the lens supporting frame.

With this arrangement, a slight adjustment can be realized since backlash, which would occur at the contacting portion of the threading between the lens supporting frame and the lens frame supporting member, is restricted by the biasing mechanism.

The present disclosure relates to subject matter contained in Japanese Patent Application No. 03-310192 (filed on Oct. 30, 1991) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENTS

Figure 1:
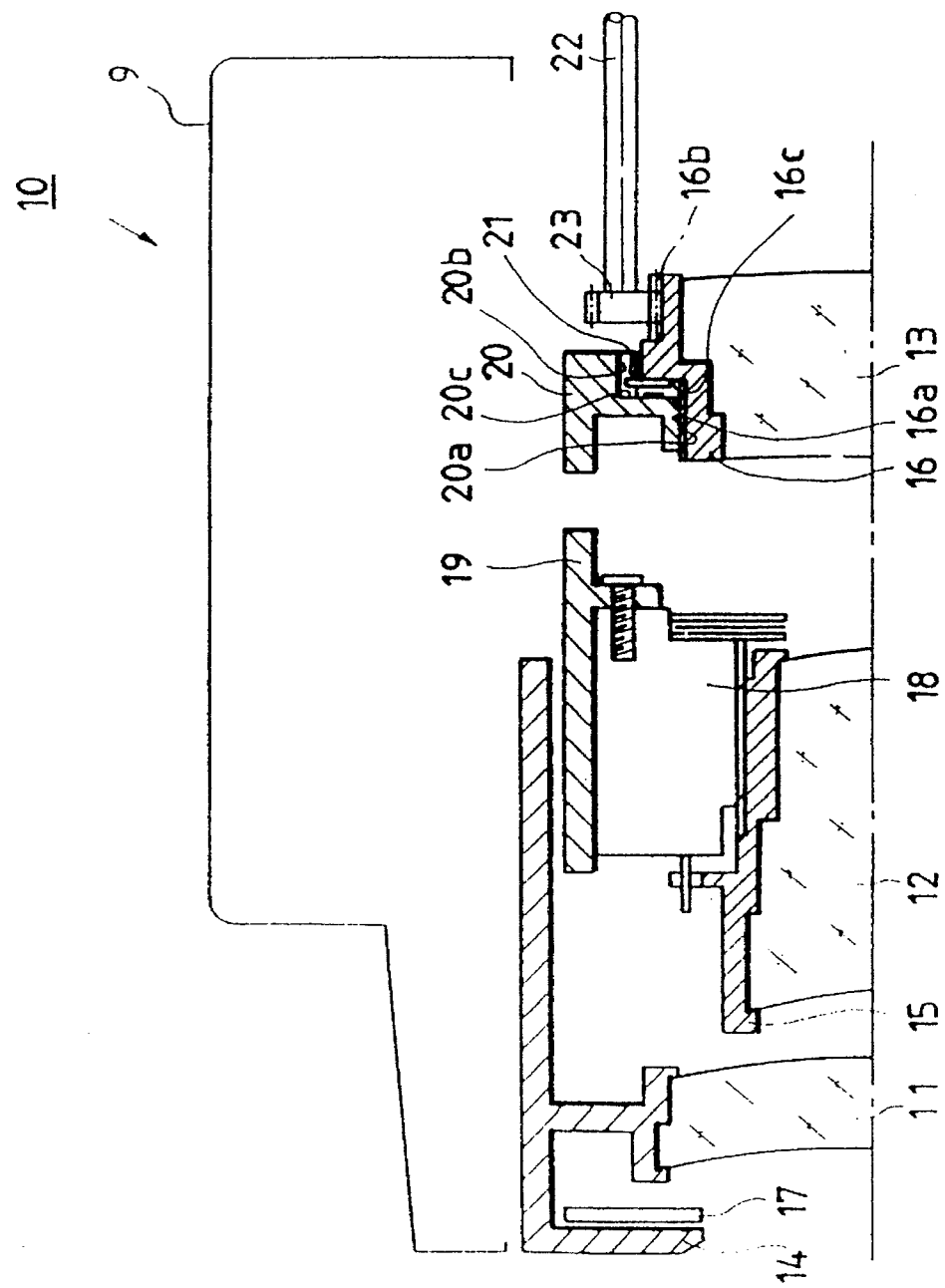
FIG. 1 is a sectional side view of a camera having a focal point adjusting device and a zoom lens at a wide-extremity position, shown along the upper half of the optical axis, according to the present invention.
Figure 2:
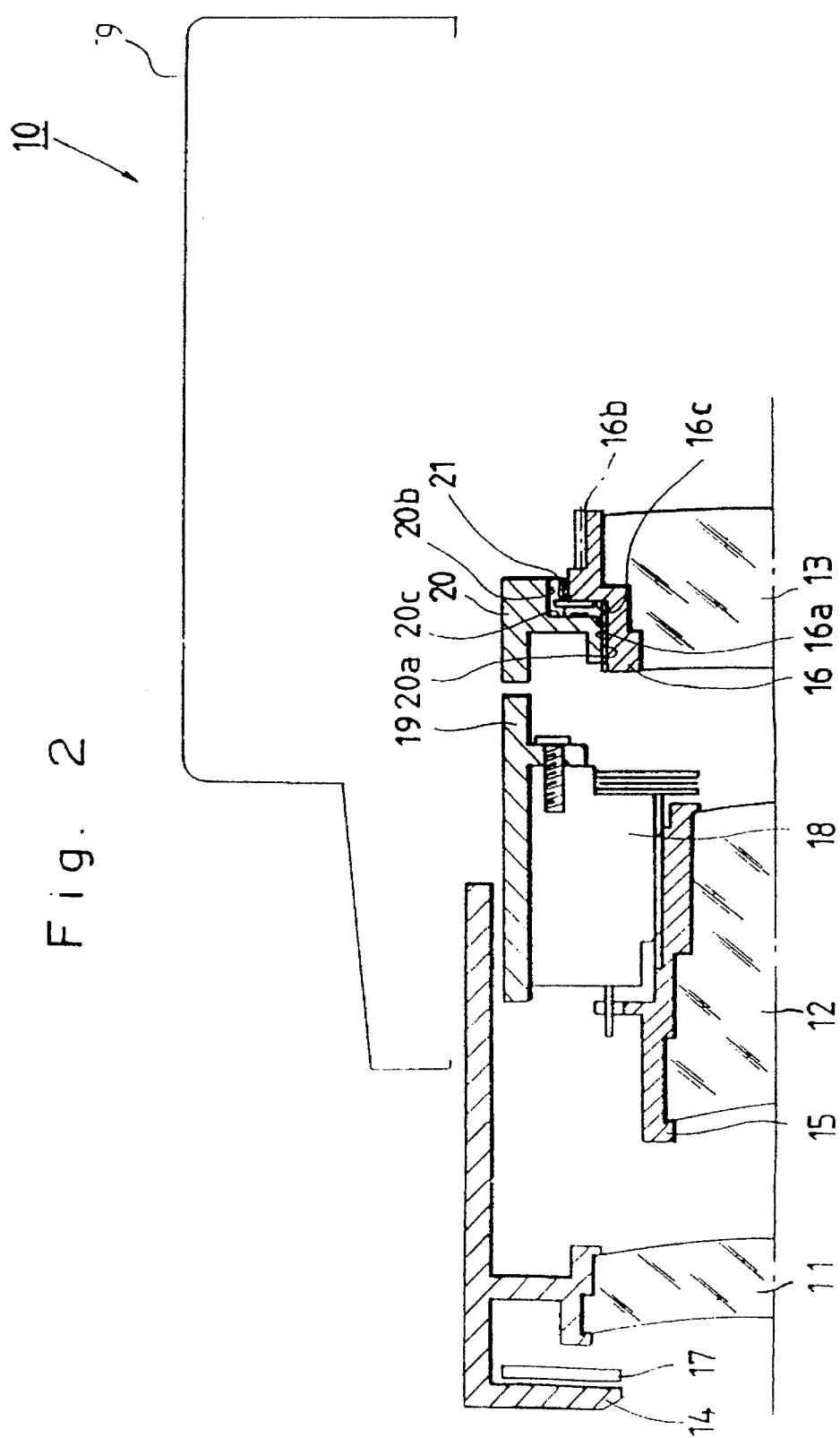
FIG. 2 is a sectional side view of the camera shown in FIG. 1, with the zoom lens at a telephoto-extremity position, shown along the upper half of the optical axis, according to the present invention.

A zoom camera 10 has a movable lens barrel 14 in which a first lens group 11 is supported. In FIG. 1, the movable lens barrel 14 is retracted in a camera body 9 to be located at its wide-angle extremity. In FIG. 2, the movable lens barrel 14 is projected from the camera body 9 to be located at its telephoto extremity. A lens protecting barrier 17 is provided inside of the front part of the lens barrel 14. The barrier 17 is kept opening when the camera is in use and is closed to protect the lens inside the movable lens barrel 14 when the camera is not in use. A movable frame 19 is provided behind the first lens group 11 in the movable lens barrel 14. In the inner periphery of the movable frame 19 is provided a AF/AE unit 18, a well known mechanism, which moves a lens supporting frame 15. The lens supporting frame 15 supports a second lens group 12, which is moved in the optical axis direction to effect the focusing operation. It should be noted that the focusing mechanism effected by the AF/AE mechanism is not at all related to the focal point adjusting device of the present invention. The focal point adjusting device of the present invention is used only when the camera is being assembled, before the camera is brought to the market from the factory, or when the camera needs to be repaired.

Figure 3:
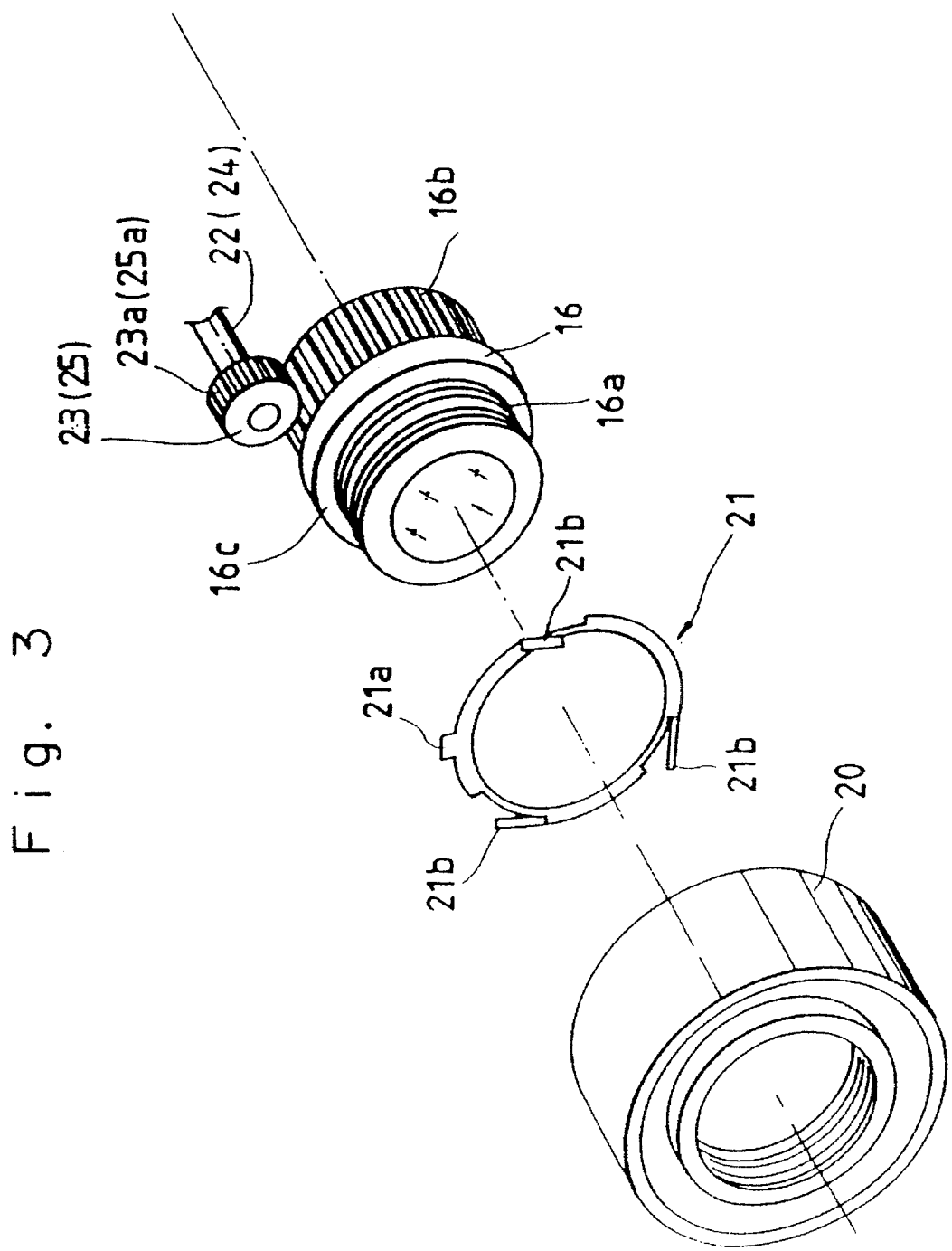
FIG. 3 is an exploded perspective view of a lens frame supporting member, a biasing member, lens supporting frame, and pinion gear connected to a shaft.

A third lens group 13, supported by a movable frame 20 (lens frame supporting member), is provided behind the second lens group 12. The movable frame 20, the movable frame 19, and the movable lens barrel 14 are each movable in the optical axis direction and are driven by a conventional cam mechanism (not shown) in a relative manner. However, they do not rotate about the optical axis. The third lens group 13 is firmly supported by a lens supporting frame 16. The lens supporting frame 16 is provided with a male helicoid portion 16a and a gear portion 16b, having a plurality of teeth, in front and rear of its outer periphery, respectively. The male helicoid portion 16a is engaged with a female helicoid portion 20a provided in the inner periphery of the movable frame 20. A ring-shaped spring member 21 is provided between the lens supporting frame 16 and the movable frame 20. The spring member 21 is made of an elastically deformable metal and is integrally provided with a positioning projection 21a and a spring arm 21b as shown in FIG. 3. More precisely, the spring member 21 is brought into contact with a face portion 16c of the lens supporting frame 16 and a face portion 20c of the movable frame 20, so that the lens supporting frame 16 and the movable frame 20 are continuously biased away from one another in order to prevent backlash at the engaged portion. The positioning projection 21a is engaged with a groove 20b provided in the rear of the movable frame 20, and elongated along the optical axis. The shape of the groove 20b corresponds to that of the positioning projection 21a.

Figure 4:
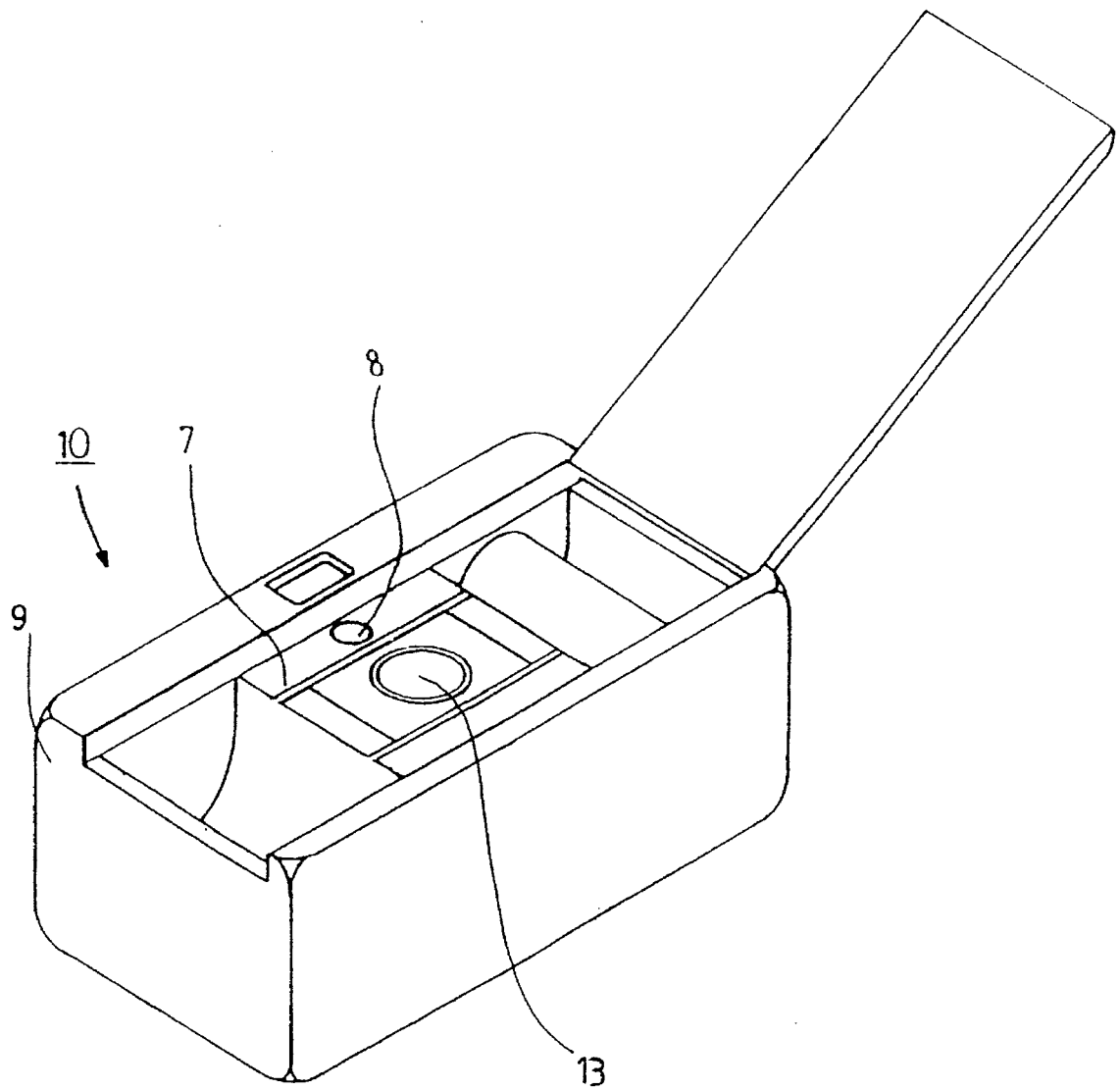
FIG. 4 is a perspective view of a camera, with its back cover open, to which the present invention is applied; and, FIG. 5 is a sectional side view of a camera according to another embodiment of the present invention, shown along the upper half of the optical axis.

When a focal point adjusting operation is carried out, the gear portion 16b of the lens supporting frame 16 is engaged with a pinion gear 23 provided at the end of a shaft 22 which has been inserted from outside the camera 10. The upper rear portion of an inside back wall 7 of the camera body 9 has an insertion hole 8. The shaft 22, having the pinion gear 23, is inserted in the camera 10 through the insertion hole 8, as shown in FIG. 4. However, the insertion hole 8 may be provided in a different area of the back of camera 10.

As may easily be understood, a focal point adjusting operation of the zoom lens of the camera, according to the present invention, is carried out as follows: The shaft 22 having the pinion gear 23 located at the end thereof is inserted into the camera 10 through the insertion hole 8. The pinion gear 23 is engaged with the gear portion 16b of the lens supporting frame 16. Thereafter, the shaft 22 is manually or mechanically rotated to move the third lens group 13 in the optical axis direction through the pinion gear 23 and the gear portion 16b. The motion is then transmitted to the male and female helicoid portions 16a and 20a to effect a focal point adjusting operation of the zoom lens.

Figure 5:
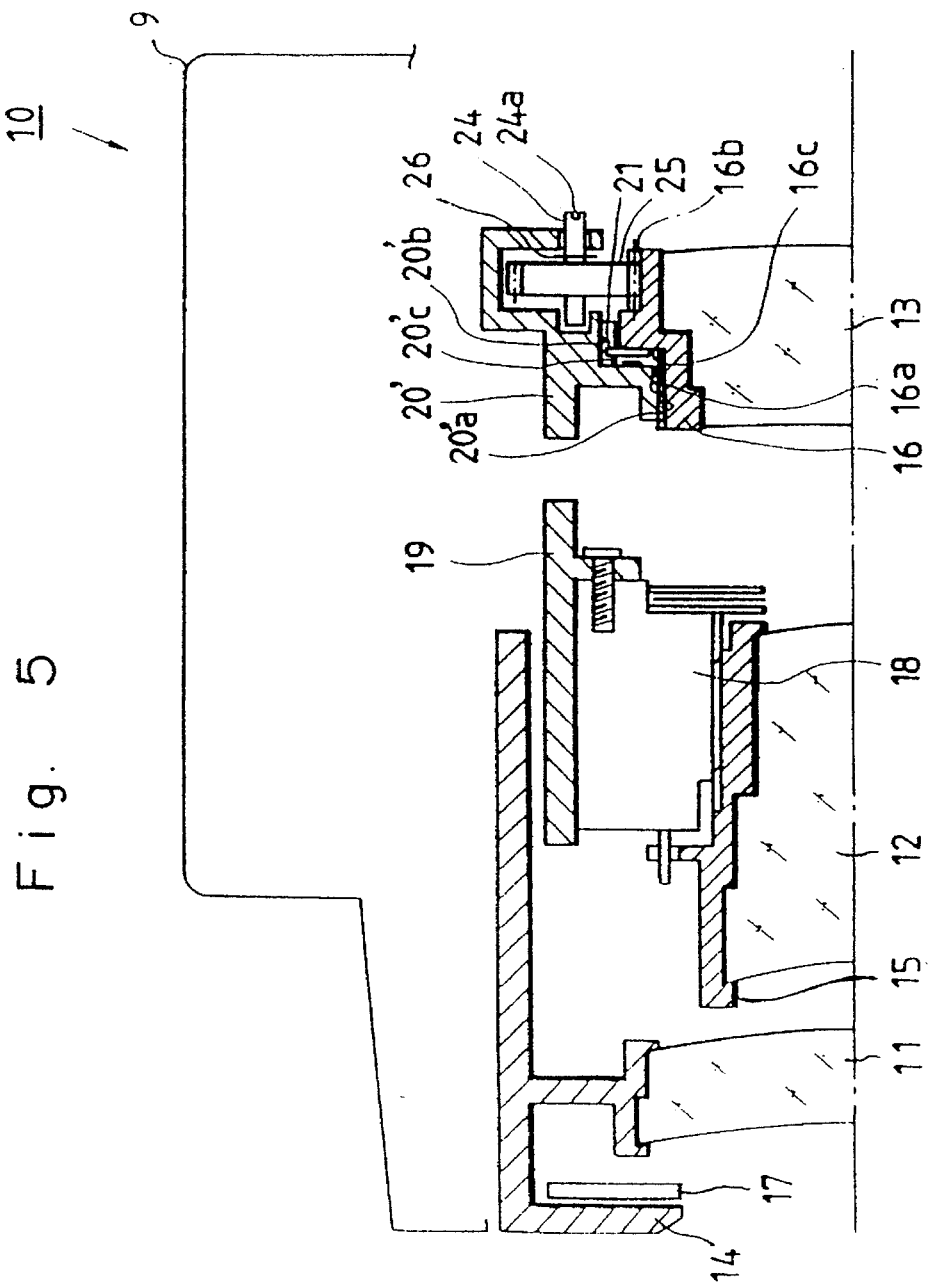

FIG. 5 shows an another embodiment of the present invention. In this embodiment, elements that are the same as those of the previous embodiment are designated with the same reference numerals. The major difference between the previous embodiment and the present embodiment is that a shaft 24 having a pinion gear 25, corresponding to shaft 22 and pinion gear 23 of the previous embodiment, respectively, is provided in the rear of the movable frame 20'. A groove 24a is provided at the rear end of the shaft 24 so that the shaft 24 can be rotated by, for example, a screwdriver to carry out a focal point adjusting operation. An E-ring 26 is engaged with a circular groove formed in the outer periphery of the shaft 24 to prevent the shaft 24 from being moved out of place. An insertion hole, through which such means as a screw driver is inserted to engage with the groove 24a to rotate the shaft 24, may be provided in the same manner as that of the previous embodiment. Also, the shape of the groove 24a may have a different shape, according to the shape of the screw driver, etc. to be used.

In the above embodiments, since the ring-shaped spring member 21 is provided with positioning projection 21a, which is engaged in the groove 20b (or 20'b) of the movable frame 20 (or 20'), rotation of the spring member 21 is restricted by the movable frame 20 (or 20'). Accordingly, the spring member 21 will not rotate when the lens frame 16 rotates. Therefore, smooth rotation of the lens frame 16 can be expected. The shape of the spring member 21 is not limited by the above embodiments, and may be changed as long as the movable frame 20 (or 20') and the lens supporting frame 16 are continuously biased away from one another in the optical axis direction.

The gear portion 16b and the pinion gear 23 (or 25) may be replaced with a gear train, bevel gears, or a bevel gear train.

Although this invention has been described with reference to particular means, materials and embodiments, it is to be understood that the invention is not limited to the particulars disclosed and extends to all equivalents within the scope of the claims.

I claim:

1. A camera comprising:

a zoom lens having a plurality of movable lens groups;

a lens supporting frame for supporting, for movement along an optical axis, a rearmost lens group of said plurality of lens groups, said supporting frame completely surrounding an outer circumference of said rearmost lens group;

said lens supporting frame having an outer circumference comprising first and second coaxial stepped portions disposed on an object side and a film plane side of said zoom lens, respectively;

said first stepped portion having a first diameter and said second stepped portion having a second diameter, said second diameter being larger than said first diameter;

a movable frame having a female helicoid on an inner periphery of said movable frame;

a male helicoid, provided on said first portion and engaging said female helicoid for moving said rearmost lens group relative to other lens groups of said plurality of lens groups;

said second portion having a rotary gear, said rotary gear being accessible through a rear wall of said camera;

a manually rotatable tool having a pinion gear, insertable into said camera through an aperture in said rear wall such that said pinion gear selectively engages said rotary gear, whereby rotation of said tool moves said rearmost lens group relative to said other lens groups of said plurality of lens groups to adjust a back focal point of said zoom lens; and a back cover selectively openable to expose and closeable to cover a film receiving space of said camera and said aperture.

2. The camera according to claim 1, further comprising a ring shaped biasing member disposed between said lens supporting frame and said movable frame.

3. The camera according to claim 2, wherein said biasing member is prevented from rotating about said optical axis.

4. The camera according to claim 1, further comprising:
said movable frame positioned about said lens supporting frame; and
said movable frame movable along said optical axis, and precluded from rotation.

5. The camera according to claim 1, wherein said rotary gear is provided exclusively for adjusting a position of said rearmost lens group along said optical axis.

6. The camera of claim 1, wherein said pinion gear rotates said rotary gear to move said rearmost lens group along said optical axis.

7. The camera of claim 1, wherein said first and second stepped portions of said lens supporting frame are positioned coaxially about said optical axis.

8. The camera of claim 1, wherein said rotary gear being exposed through said rear wall.

* * * * *